INVENTORS
ARTHUR R. BEAN, JR.
DONALD W. FRAGA
ROGER H. MANN
ATTORNEYS

_United States Patent Office_

3,553,295
Patented Jan. 5, 1971

3,553,295
POLYMERIZATION MONITOR
Arthur R. Bean, Jr., Buena Park, Donald W. Fraga, Redondo Beach, and Roger H. Mann, Coronado Del Mar, Calif., assignors to Shell Oil Company, New York, N.Y., a corporation of Delaware
Filed Apr. 25, 1968, Ser. No. 724,206
Int. Cl. C08d 3/06, 3/10
U.S. Cl. 260—879         13 Claims

ABSTRACT OF THE DISCLOSURE

A continuous indication of the active chain concentration in a homogeneous solution polymerization reaction admixture is obtained by comparing the absorbance of transmitted radiation by active and deactivated portions of the reaction admixture.

---

It is generally believed that in the solution polymerization of unsaturated monomers to form high molecular weight polymers, the polymer chains grow during the polymerization reaction by the addition of monomer units on the end of the chain. These growing chains are variously identified as living chains or active chains. The growing ends of these chains are generally believed to be associated with the polymerization catalyst so that there is a catalyst unit at the living end of the chain. These living ends are associated with an active measurable chromophore. The active polymerizing admixture may, for purposes of brevity, be referred to as "active cement." After the polymerization reaction has been killed the resultant admixture may, for purposes of brevity, be referred to as "terminated cement."

The concentration of living chains in a homogeneous solution polymerization reaction admixture during polymerization strongly influences the characteristics of the final product. The average molecular weight and the molecular weight distribution of the product are influenced by the concentration of living chains during the polymerization reaction. Present procedures for rapidly determining the concentration of living chains in the reaction admixture are generally indirect and give only approximate results.

Impurities in the reactants which are fed to the reaction zone often react with the catalyst, thus reducing the amount of catalyst available for carrying out the polymerization. In general, present procedures for determining the amount of catalyst which has reacted with impurities are indirect and give only approximate results.

It is often desired to terminate a polymerization reaction at some particular point. In general, this is accomplished by adding some reagent to the polymerization reaction which will react with the catalyst or the living chain end, thus halting the growth of the polymer chains. The amount of reagent required to completely terminate a reaction, without adding large excesses of the reagent, is dependent upon the concentration of active chains in the polymerization admixture. Previously, it was generally impossible to accurately follow the course of a reaction terminating operation while such operation was being carried out.

This invention provides a rapid, continuous, and direct indication of the active chain concentration during the homogeneous solution polymerization of unsaturated monomers. This procedure is applicable to both continuous and batch operations involving homo-, co-, and multi-polymerizing reaction admixtures.

According to this invention, a rapid, continuous, and direct indication of the active chain concentration in an active cement is provided by comparing the absorbance of transmitted radiation by active and deactivated portions of the cement. This comparison is accomplished using a narrow band wave length of radiation and a dual cell photometer. This procedure is applicable to reaction admixtures which, in the active state during polymerization, have detectable absorbance characteristics for a predetermined wave length of radiation which are different from those of the inactive cement at the same stage of polymerization. The procedure is particularly desirable where there is considerable background interference which makes the absorbance characteristics obtained from a single cell photometer ambiguous.

The indication of the active chain concentration in the polymerization zone may be recorded for visual observation, such as, for example, on a moving graph. Also, the indication of the active chain concentration may be converted into a suitable signal which is transmitted through known control devices to regulate or adjust at least one process variable in the polymerization zone in response to indicated changes in the active chain concentration. If desired, both a visual indication, in the form of a moving graph or other means, and automatic regulation of the process variables may be provided.

A calibration curve is conveniently established by plotting the net photometer readings obtained for the differential absorbance of transmitted radiation against values obtained for the same active cements by known analytic procedures, such as, for example, tritium-counting. This analytic procedure is described in the Journal of Polymer Science: part A, vol. 3, pp. 2243–2257 (1965), "Alkyl-Free Cobalt Catalyst for the Stereospecific Polymerization of Butadiene"; J. G. Balas et al. Using such a calibration curve it is possible to obtain a direct indication of the active chain concentration in an active cement.

According to this invention, a homogeneous solution polymerization reaction admixture is established in a reaction zone according to known procedures and using known reagents. A representative sample of the reaction admixture is withdrawn from the reaction zone. Preferably the sample is withdrawn continuously. The sample is split into two portions, one of which is deactivated, for example, by treatment with a suitable reagent. For purposes of calibration the other stream of the withdrawn sample may also be deactivated for brief periods from time to time. The deactivated sample is passed through a reference cell in a dual cell photometer, and the active sample is passed through a sample cell in the same photometer. A beam of transmitted radiation is split into two beams having the same optical characteristics. One beam is passed through the reference cell, and the other is passed through the sample cell. The differential absorbance of the radiation passed through the two cells is obtained by impinging the two beams on separate phototubes and comparing the output from the two phototubes. The output from the phototubes may be recorded or used to activate means for regulating one or more process variables in the polymerization zone.

Referring particularly to the drawings, there is illustrated:

Figure 1:
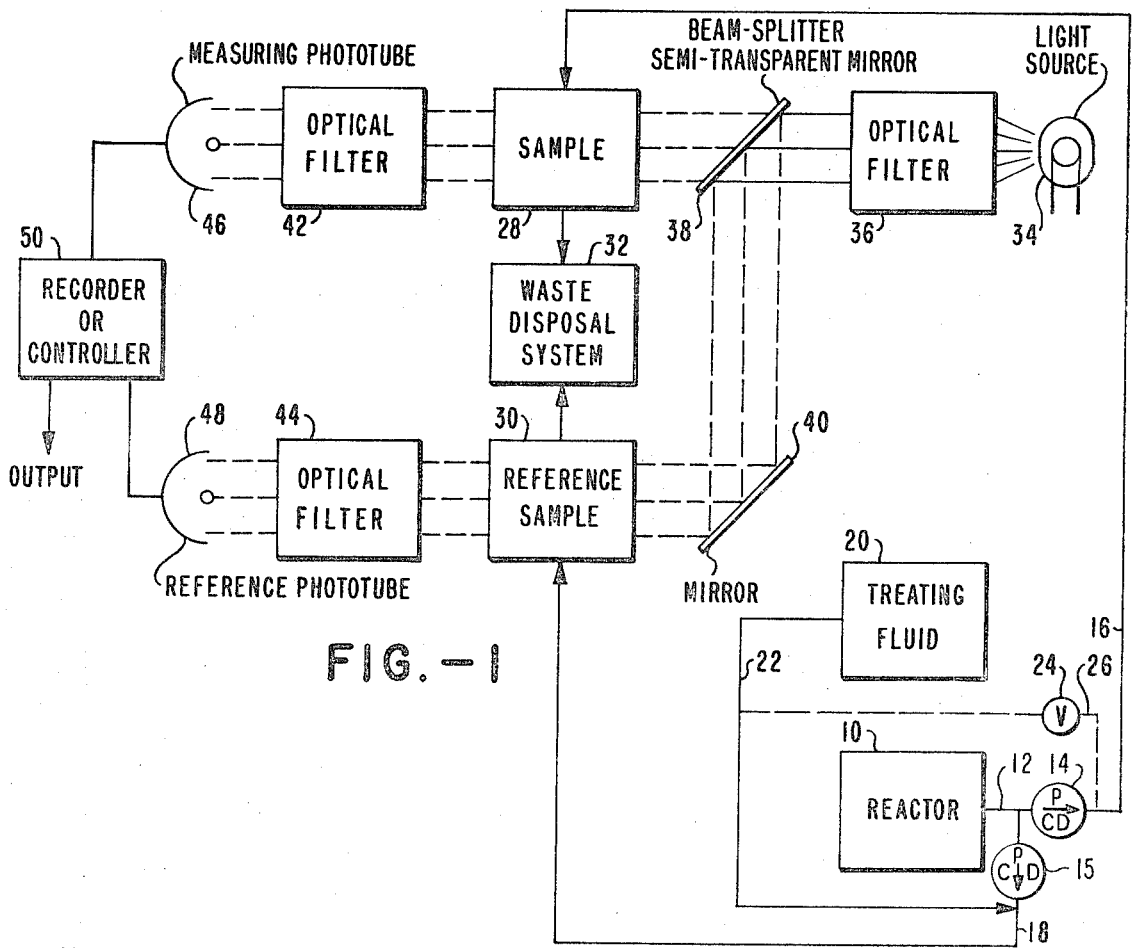
FIG 1 is a schematic drawing of one embodiment of the invention.

With particular reference to FIG. 1 there is illustrated schematically a reactor 10. Conduit 12 is positioned so as to withdraw a representative sample of active cement from the reaction zone in reactor 10 under the urging of constant discharge pumps 14 and 15. From pump 14 sample conduit 16 carries active cement directly to sample measuring cell 28. From pump 15 reference sample conduit 18 carries cement to reference measuring cell 30. Treating fluid under pressure from treating fluid receptacle 20 passes through treating fluid conduit 22 and into admixture with active cement in conduit 18. The treating fluid deactivates or terminates all of the active chains in the cement carried by conduit 18 to produce a deactivated cement. Treating fluid is prevented from passing into sample conduit 16 by valve 24 in treating fluid line 26. When it is desired to deactivate both the cement in conduit 18 and the cement in conduit 16, this is accomplished by opening valve 24 so that treating fluid passes through line 26 into sample conduit 16. Suitable mixing chambers, not shown, may be provided, if desired, to admix the treating fluid with the cement in conduits 16 and 18, respectively. After the cement passes through the respective measuring cells it is discharged to waste disposal system 32.

The photometer which is used to compare the absorbance characteristics of the samples in cells 28 and 30, respectively, is indicated schematically in FIG. 1 and includes a light source 34 which transmits a beam of radiation through optical filter 36. Filter 36 passes only a desired predetermined narrow band wave length of radiation. After passing through optical filter 36 the transmitted beam of radiation comes into contact with semi-transparent mirror 38, which divides the transmitted beam of radiation into two beams having the same characteristics. One of the beams passes through sample measuring cell 28. The other beam is reflected from mirror 38 to mirror 40 and then through reference measuring cell 30. From cell 28 the first beam passes through optical filter 42 in which extraneous wave lengths of radiation are removed from the beam. The first beam is then impinged upon sample measuring phototube 46. The second beam leaves cell 30 and passes through optical filter 44. Optical filter 44 performs the same function as optical filter 42. From optical filter 44 the second transmitted beam is impinged upon reference measuring phototube 48. The outputs of phototubes 46 and 48, respectively, are compared in recorder or controller 50, which in turn generates an output of predetermined desired characteristics. The nature of recorder or controller 50 and the output generated by this device are well known.

Figure 2:
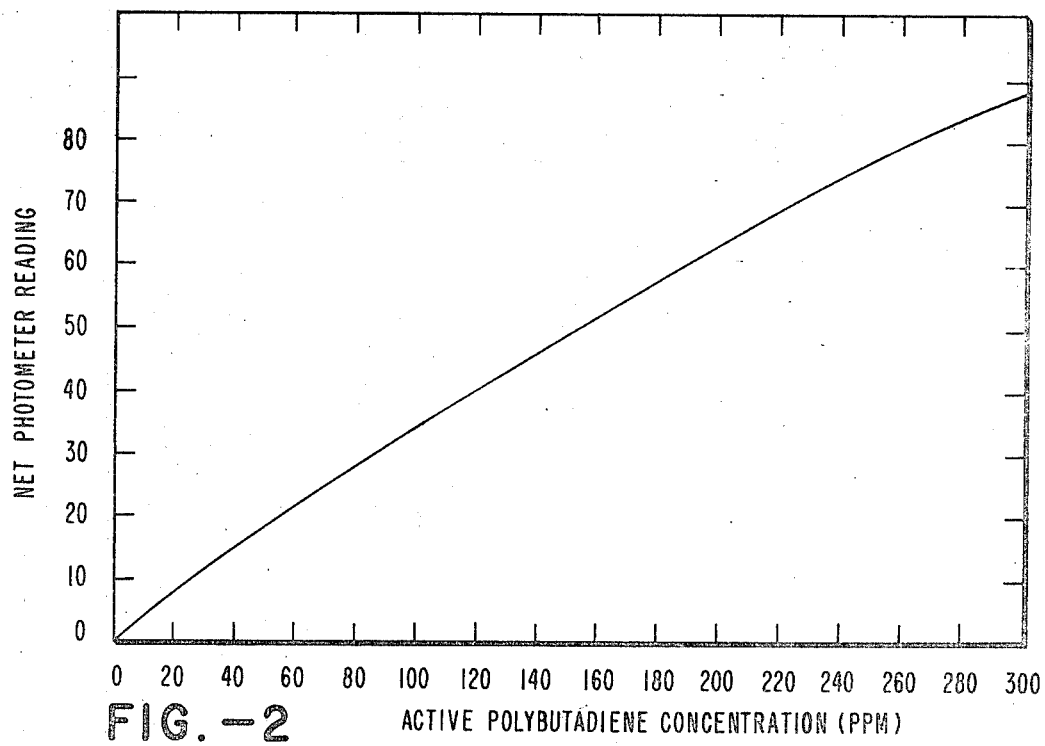
FIG. 2 is a calibration curve showing the relationship between net photometer readings and active polybutadiene chain concentration as determined analytically.

When it is desired to obtain a direct reading of the concentration of the active chains within an active cement, it is necessary to calibrate the photometer. FIG. 2 is a typical calibration curve for a dual cell photometer for the homogeneous solution polymerization of polybutadiene. The polybutadiene is polymerized according to the following recipe: Cyclohexane solvent is purified by: butyllithium scavenging to reduce the level of reactive impurities. The butadiene monomer is also purified by butyllithium scavenging. The treated cyclohexane solvent and butadiene monomer are charged to a polymerization vessel in an inert atmosphere. Butyllithium is added to the charge in the polymerization vessel in small increments, of less than three parts per million each, to scavenge any remaining traces of reactive impurities. At the signal of incipient polymerization initiation, as indicated by pressure and temperature increase and the appearance of active chromophores, the total amount of butyllithium initiator which it has been determined will be required for the polymerization is added at one time. The polymerization reaction is carried out at a temperature of about 50 degrees centigrade. The quantities of the materials charged to the reaction vessel are as follows.

| Charged material: | Parts by wt. |
| --- | --- |
| Butadiene monomer | 100 |
| Cyclohexane solvent | 900 |
| Butyllithium initiator | 0.11 |

For the purposes of preparing this calibration curve, a suitable recorder 50 is selected so that it will provide an indication, on a continuous chart, which is indicative of the difference between the output from phototube 48 and the output from phototube 46. This difference is the net photometer reading, and it is this net value which is plotted on the ordinate in FIG. 2. The abscissa in FIG. 2 indicates the concentration of the active polybutadiene chains, in parts per million, in the active cement. The values plotted on the abscissa are obtained by known, conventional analytical procedures, such as tritium-counting.

Figure 3:
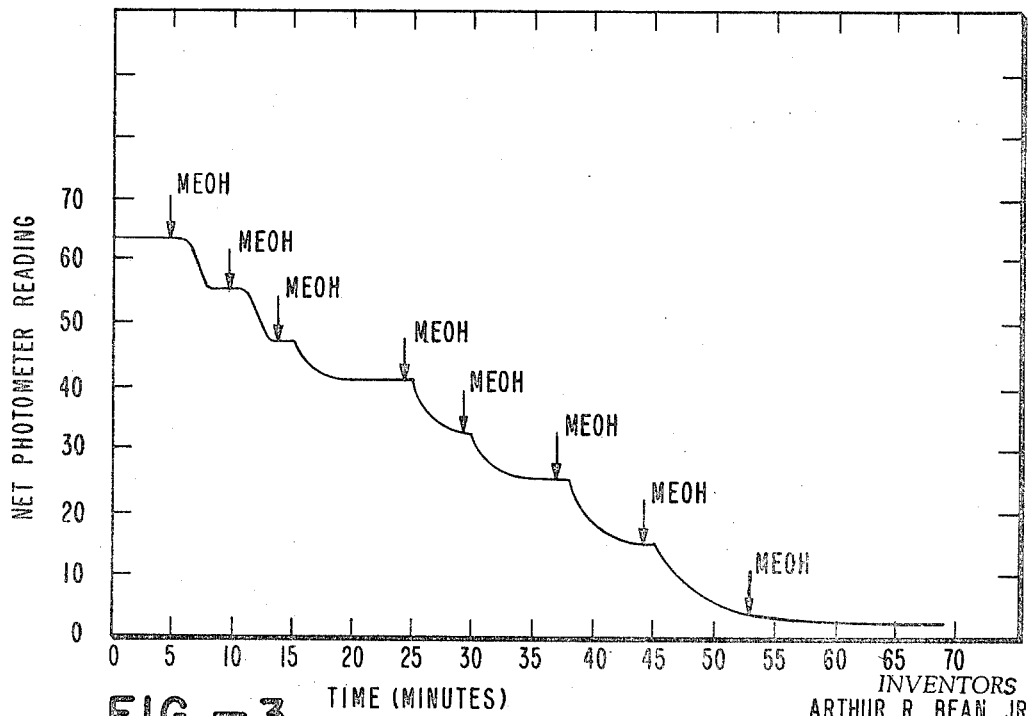
FIG. 3 is a curve showing the change in photometer readings over a period of time for equal incremental additions of methanol to terminate living isoprene chains.

The curve shown in FIG. 3 is produced by recorder 50 on a continuous graph as small increments of the terminating agent, methanol, are added to a polyisoprene reaction admixture. The homopolyisoprene reaction admixture which was used in the preparation of the curve shown in FIG. 3 has the following polymerization recipe.

| Charged material: | Parts by wt. |
| --- | --- |
| Isoprene monomer | 100 |
| Cyclohexane solvent | 900 |
| Butyllithium initiator | 0.11 |

The cyclohexane solvent and isoprene monomers were purified by activated alumina treatment to reduce the level of reactive impurities and were then charged to a polymerization vessel under an inert atmosphere. The remaining traces of reactive impurities in the charged polymerization vessel were titrated by small incremental additions (less than three parts per million) of butyllithium until incipent initiation was signaled by an increase in pressure and temperature and the appearance of an active chromophore in the polymerization vessel. At this point the total amount of butyllithium initiator required for the polymerization reaction was added at one time.

The polymerization was carried out at a temperature of about 50 degrees centigrade. The reaction was terminated by incremental additions of methanol to the reaction admixture in the polymerization vessel with the results shown in FIG. 3. The almost immediate response of the photometer reading to the addition of terminating agent shows the sensitivity and responsiveness of this instrument to changes in the living chain concentration in an active cement. The photometer reading can be calibrated, if desired, so as to give a direct reading from this curve of the concentration of active chains in the reaction admixture. According to this embodiment, an operator may accurately predict the amount of terminating agent which will be required to kill a given polymerization reaction and may observe directly the effect of the addition of a terminating agent on the concentration of living polymer chains.

Figure 4:
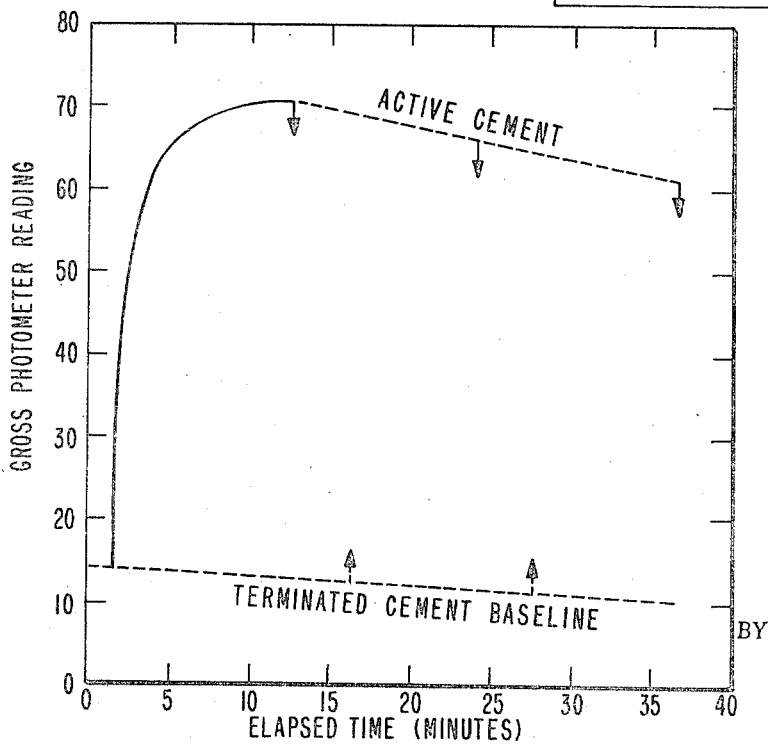
FIG. 4 contains two curves showing gross photometer readings for a random styrene-butadiene copolymerization reaction.

The curves shown in FIG. 4 are typical of those obtained where there is a change in the characteristics of the reference and sample cells over a period of time. As illustrated, the terminated cement base line declines somewhat with time. The random styrene-butadiene copolymerization reaction which was monitored to produce the curve shown in FIG. 4 was carried out using the following polymerization recipe.

| Charged material: | Parts by wt. |
|---|---|
| Monomer total (butadiene, 74 parts and styrene, 26 parts) | 100 |
| Cyclohexane solvent | 220 |
| Isopentane solvent | 220 |
| Divinylbenzene branching agent | 0.09 |
| Butyllithium initiator | 0.069 |

The cyclohexane and isopentane solvents are scavenged by molecular sieve treatment to reduced the level of reactive impurities. Likewise, the butadiene and styrene are also given an activated alumina treatment to reduce the level of reactive impurities. In order to produce a copolymer containing 75 weight percent butadiene and 25 weight percent styrene, all of the styrene and approximately 6 parts of the butadiene are charged initially to the reaction vessel under inert conditions. The remaining 68 parts of butadiene are charged incrementally to the reaction vessel during the polymerization reaction to maintain a constant 4.5 to 1.0 styrene to butadiene ratio throughout the polymerization. The polymerization temperature in the reaction vessel is maintained at about 90 degrees centigrade for a period of two hours.

The wave length of transmitted radiation which is employed in the dual beam photometer is selected so that there will be a minimum of interference from chromophores other than that which it is desired to detect. In general the selected wave length is within the ultraviolet range of from about 180 to 4,000 angstroms. When desired, wave lengths from the infrared range of from about 7,000 to 14,000 angstroms may be used where active chromophores are present for this infrared range.

In the following examples and throughout this disclosure all parts and percentages are by weight unless otherwise stated.

EXAMPLE I

Using the homopolybutadiene recipe set forth above, a homogeneous solution polymerization reaction is initiated in a reaction vessel. A stream of the reactive admixture is continuously removed from the reaction vessel. The stream is divided into two portions. One of the two portions is mixed with isopropyl alcohol to kill the living polybutadienyl lithium chains in that portion. The treated portion is passed to the reference cell of the dual beam, dual cell colorimeter shown schematically in FIG. 1. The untreated portion of the reactive admixture is passed to the sample measuring cell of the dual beam, dual cell colorimeter. This colorimeter is commercially available and is identified as the "Du Pont Model 400 Dual Beam Photometric Analyzer." There is no detectable difference between the optical characteristics of the paths followed by the beams which pass, respectively, through the sample measuring cell and the reference cell prior to the introduction of the samples into these cells. The wave lengths of transmitted radiation which are passed through the samples are centered at 3,130 angstroms. The measuring and referencee phototubes each develop a current output which is directly proportional to the light intensity striking the respective phototube. The output from the respective phototubes is amplified and fed into the control portion of a recorder wherein the difference between the amplified output voltage of the measuring phototube and the amplified output voltage of the reference phototube is obtained. This difference is the net photometer reading which is inscribed as a line on a moving chart. This difference is due to the concentration of the active polymer in the sample cell, since the background absorption is the same in each cell. This difference is observed to vary in response to changes in the concentration of the active polymer.

During the course of the polymerization reaction at several different net photometer readings, samples of the active cement are withdrawn from the reactor. These withdrawn samples are killed with tritiated methyl alcohol which adds a tritium (radioactive hydrogen) to each polymer chain that contains active lithium in the same proportion that tritium is present among the active hydrogens of the tritiated methanol. Analysis of these killed withdrawn samples for tritium gives the concentration of active lithium (measured as butyllithium) in the active cement. The photometer readings are influenced somewhat by the density of the samples, so all of the photometer readings are adjusted by calculation to a standard specific gravity of 0.775 using the cell temperature and cement composition as the basis or calculation. The values obtained analytically by tritium counting are correlated with the adjusted net photometer readings, and the calibration curve shown in FIG. 2 is prepared. The curve in FIG. 2 indicates active polybutadiene concentration in parts per million (p.p.m.) directly from net photometer readings, adjusted by calculation to a standard specific gravity of 0.775. The molecular weight of the polybutadiene is calculated from the solids content and the active polybutadiene concentration in the active cement.

EXAMPLE II

The homopolyisoprene recipe set forth above is utilized in a homogeneous solution polymerization reaction. The active isoprene cement is calibrated, using essentially the procedure described in Example I, above, over the range of from 15 to 245 parts per million (p.p.m.). The absorption characteristics of active isoprene cement are very similar to those for active butadiene cement, and the calibration curves for these two materials are found to be very similar.

EXAMPLE III

A styrene-butadiene block copolymer is prepared by using an homogeneous solution polymerization reaction. The active styrene-butadiene cement, during the polymerization of the butadiene block, is calibrated, using essentially the procedure described in Example I, above. The absorption characteristics of the active styrene-butadiene cement compare very closely to those of the active butadiene cement used in Example I, above. The presence of the styrene block has no observable effect on the photometer response during the monitoring of the butadiene block polymerization. The calibration curve for this copolymer during the butadiene block polymerization is found to be the same as that shown in FIG. 1 for the homopolymerization of butadiene.

EXAMPLE IV

The homopolyisoprene recipe set forth above is utilized in a homogeneous solution polymerization reaction. The entire reaction is terminated by eight equal incremental additions of methanol to the reaction admixture in the reaction vessel. The photometric procedure described in Example I, above, is used to monitor the reaction. The curve obtained from the net photometer readings is shown in FIG. 3. The downwardly directed arrows headed by the letters "MEOH" in FIG. 3 indicate the points in time at which the methanol is added. The photometric response to the addition of the methanol terminator only lags the actual addition of the terminator by from about 30 to 120 seconds, and the response is accurate throughout the entire range of active polyisoprene concentration. The briefly delayed reaction to the addition of the terminator is due in part to the time required for the sample to pass from the reactor to the photometer.

EXAMPLE V

Using the styrene-butadiene random copolymer recipe set forth above, an homogeneous solution polymerization reaction is established in a reactor vessel. The photometric procedure described in Example I, above, is used to monitor the reaction with certain modications as described in more detail hereafter. Butadiene monomer is continuously added to the reactor during the course of the reaction. There is some active styrene present in the reactor at any given instant during the polymerization. However, the instantaneous concentration of the active styrene species in the reaction admixture is very low due to the kinetics of the system. The level of active chains in the reactor declines constantly during the course of the reaction due to the presence of impurities continuously entering the reactor with the added butadiene monomer and, also, due to the time-dependent thermal termination of the active chains at the polymerization temperature of 90 degrees centigrade. Also, it is found that the terminated cement base line declines continuously with time, as shown in FIG. 4. This decline is found to be due to the deposit of a precipitate within the sample cells which changes the path length of these cells by unpredictable amounts. Because of these constantly changing conditions, it is necessary to monitor the reaction over substantially its entire course to provide a profile of the rate of decline of active chains. It is also necessary to establish the terminated cement base line accurately so that the net photometer reading (that is, the instantaneous difference between the curves representing the active and terminated cements, respectively) accurately represents the absorption corresponding only to the active species. The continuous base line is established during the course of the reaction by periodically mixing the measuring sample as well as the reference sample with isopropyl alcohol to terminate all of the active chains in both cells. The photometer reading stabilizes in about three minutes after the sample cell is switched from active to deactivated cement or vice versa. The change in the photometer reading using this switching technique is due entirely to the concentration of the active chromophore in the active cement. The switching times and directions are indicated by arrows on the curves in FIG. 4. The net photometer reading is calibrated using tritium-counting as the basis as described in Example I, above.

The Mooney viscosity of random styrene-butadiene copolymers is highly sensitive to variations in molecular weight. Molecular weight is dependent on the history of the concentration of the active chains during the course of the polymerization reaction. The Mooney viscosity for a given monomer conversion level can be predicted using the net photometer readings to indicate the history of the active polymer concentration during the course of the reaction. The particular reaction is quenched at a point in time which is selected so as to achieve a desired Mooney viscosity.

EXAMPLE VI

Calibration curves may be obtained and the course of the reactions may be followed with accurate reproducible results using the procedures described in the foregoing examples, substituting piperylene, trivinylbenzene, or hexatriene-1,3,5 for the reactive monomer, and benzene, tetrahydrofuran, or diphenyl ether for the solvent. Reliable calibration curves may be established according to the procedures described in the above examples using butylsodium, butylcesium, butylrubidium, or butylpotassium in the place of the butyllithium according to known polymerization recipes.

It is believed that the alkali metal portion of initiator becomes disassociated from the alkyl radical at the time polymerization is initiated so that insofar as the monitoring of the polymerization process, according to the present invention, is concerned the nature of the alkyl radical in the initiator is not significant.

The process of this invention is adapted to constantly and accurately monitoring the active concentration of an active cement at living chain concentrations ranging from as low as about 1 part per million up to about 400 parts per million and above. In general most polymerization reactions are conducted in such a manner that the active chain concentration is below 400 parts per million.

The procedure of this invention is particularly applicable to those polymerization reactions in which there is considerable background interference at all wave lengths of transmitted radiation for the desired chromophore. In general the chosen wave length of transmitted radiation should be selected so that there is a minimum of background interference with the desired chromophore. The transmitted radiation absorption characteristics of commercially available reagents which are used in polymerization reactions are generally well known or are readily determniable using well-known procedures and equipment.

The rapid and accurate monitoring, according to this invention, of active chromophore concentration at very low concentrations in the vicinity of 1 part per million permits the accurate titration of reactive impurities in the solvents and monomers which are used in homogeneous solution polymerization reactions. This permits the use of somewhat impure reagents containing varying and unknown amounts of impurities. Small amounts of the polymerization initiator are added to titrate the impurities, and the reagent is monitored according to this invention. An active chromophore appears as soon as the impurities have been titrated. In this manner the reagents are brought rapidly and accurately to a predetermined high degree of purity without the necessity of determining the impurity content.

The molecular weight of the final polymerized product is very sensitive to the amount of catalyst utilized in the polymerization reaction. The presence of impurities in the reaction admixture in the reaction zone makes it impossible to accurately predict the amount of catalyst which will be available for the polymerization reaction. The use of the present colorimeter permits almost instantaneous detection of the formation of living polymer chains. When small amounts of catalyst are admixed incrementally to the reaction admixture, the appearance of living chains indicates that all of the impurities have been titrated with catalyst, and any additional amounts of catalyst which may be added will all be available for the polymerization reaction. In this manner the amount of catalyst which is calculated to give the desired molecular weight may be added as soon as the net photometer readings indicate that all of the impurities have been titrated by previous additions of catalyst. This very accurate control of catalyst concentration in the reaction zone permits the achievement of a predetermined molecular weight. Catalyst and monomer concentration may be adjusted during the reaction in response to photometer readings.

The deactivating agent which is used to terminate the living chains in the sample which passes through the reference cell is selected so that it has no absorbance characteristics which interfere with the absorbance characteristics of the active sample at the wave length being used. In general, suitable deactivating agents are liquids which may be injected into and admixed with the liquid stream of reaction admixture. Suitable deactivating agents include; for example, isopropyl alcohol, s-butyl alcohol, methanol, and the like.

The fluid handling system which withdraws a sample of the reaction admixture from the reaction zone and pumps it through the dual cells of the photometer is preferably so designed that a minimum time lapse occurs between the withdrawal of the sample from the reaction zone and the subjection of that sample to a beam of transmitted radiation. The withdrawn samples are preferably maintained under pressure so as to prevent the formation of bubbles which would interfere with the measurement of the fluids absorption characteristics. The fluid handling system is so designed that the temperature of the sample does not fluctuate greatly between the time it is withdrawn from the reaction zone and the time it is subjected to transmitted radiation in the cells of the photometer.

The photometer is designed so that the only variable in the optical system between the light source and the phototubes is attributable to the absorption characteristics of the samples within the cells. During operation the radiation from the measuring and reference beams strikes the respective phototubes, and a current output is developed by each phototube which is directly proportional to the light intensity striking that phototube. Amplifiers are provided for each phototube. The logarithmic characteristic of the measuring and reference amplifiers causes each to produce a direct current voltage output which is directly proportional to the logarithm of the phototube current. The currents are subtracted in a control box to produce a final output voltage which is proportional to the difference between the logarithms of the phototube currents. This final output voltage is also proportional to the difference between logarithms of the intensities of the reference and measuring beams. According to Beer's Law of Optics this difference in logarithms is directly proportional to the sample concentration and thickness. The final output voltage varies linearly with sample concentration and thickness. As the concentration of the active chains vary in the sample measuring cell, the light arriving at the measuring phototube also varies and so does the measuring phototube current. The reference circuit, however, is not affected at all since there is no change in the concentration of the active chains in this cell. The sample thickness remains constant so the final output voltage varies in response to changes in the active chain concentration in the measuring sample. Instruments of this type are available commercially, one of which is identified as the "Du Pont Model 400 Dual Beam Photometric Analyzer."

The use of a dual beam, dual cell photometer, according to this invention, permits the accurate measurement of active chain concentration in a polymerizing reaction admixture even when there is considerable background interfreence at the wave length employed. Considerable background interference is present, for example, in butadiene, isoprene, and random styrene-butadiene reaction admixtures. If desired, the techniques of this invention may also be employed in reaction admixtures, such as during the polymerization of styrene to homopolystyrene. where the background interference is small in comparison to the strong absorbance of polystyryllithium carbanions.

The declining terminated cement base line, illustrated in FIG. 4, is believed to be caused by the build up of precipitate within the measuring and reference cells. This condition changes the sample thickness and is found in such polymerization systems as, for example, random styrene-butadiene copolymerization. In this reaction the viscosity of the reaction admixture increases as the polymerization proceeds which tends to aggravate the precipitate build up in the cells of the photometer. So long as the position of the terminated cement base line and the active cement curve are both known, the difference between these two lines at any given instant will accurately reflect the concentration of active chains within the reaction admixture. A switching technique, as described herein, is utilized to establish the terminated cement base line.

The present invention is applicable to a large variety of polymerization reactions and is generally not dependent upon any particular polymerization recipe.

In general, this invention is particularly useful when employed to monitor those polymerization reactions wherein the reactive monomers are polymerized by a homogeneous solution polymerization process. Suitable monomers for use in such a process are known to include; for example, conjugated diene monomers containing from four to ten carbon atoms, vinyl aromatic compounds, monounsaturated hydrocarbons, and polyunsaturated hydrocarbon monomers. Suitable monomers include: for example, butadiene; isoprene; 2,3-dimethyl butadiene; pentadiene-1,3; hexadiene-2,4; octadiene12,4; hexatriene-1,3,5; 2-phenylbutadiene-1,3; styrene; vinyl naphthalene; divinyl benzene; 1-phenyl pentadiene-1,3; trivinyl benzene; divinyl naphthalene; and the like. This list will suggest to those skilled in the art many other known monomers which may be polymerized by an homogeneous solution polymerization process.

Suitable diluents or solvents, for use in solution polymerization recipes, are well known and include for example, nonpolar hydrocarbon diluents, such as aliphatic, cycloaliphatic, or aromatic hydrocarbons containing four or more carbon atoms, ethers, and amines in admixture with other diluents. Specific diluents, include; for example, cyclohexane, isopentane, octane, hexane, benzene, toluene, tetrahydrofuran, diphenyl ether, and the like. Any diluent may be used according to the present invention provided it does not have an absorbance characteristic which interferes with the comparison of the absorbance of the transmitted radiation by active and deactivated cements.

The optical filters employed according to this invention generally pass a very narrow bandwidth of transmitted radiation of from about 5.0 to 75 angstroms in width and preferably from about 10 to 20 angstroms in width.

What has been described are preferred embodiments in which changes and modifications may be made without departing from the spirit and scope of the accompanying claims.

What is claimed is:

1. A process comprising:
   removing a stream of active reaction admixture from a homogeneous solution polymerization reaction zone;
   treating a portion of said stream with a deactivating agent to produce a deactivated reference sample; and
   comparing the absorbance characteristics of said reference sample with the absorbance characteristics of a second portion of said stream at the same narrow wave length band of transmitted radiation within the ultraviolet range up to 4000 angstroms and the infrared range of from 7000 to 14,000 angstroms.

2. The process of claim 1 wherein said process is continuous and including intermittently treating said second portion of said stream with a deactivating agent to deactivate said second portion.

3. A process for obtaining an indication of the active chain concentration in a homogeneous solution polymerization reaction which comprises:
   establishing a homogeneous solution polymerization reaction admixture containing active chains in a reaction zone;
   withdrawing a sample of said admixture from said zone;
   treating a portion of said sample to deactivate the active chains in said portion; and
   comparing the absorbance characteristics of a deactivated portion of said sample with the absorbance characteristics of an active portion of said sample at the same narrow wave length band of transmitted radiation to obtain said indication of active chain concentration said radiation being within the ultraviolet range up to 4000 angstroms and the infrared range of from 7000 to 14,000 angstroms.

4. The process of claim 3 wherein said reaction admixture comprises a conjugate diene.

5. The process of claim 3 wherein the active chains comprise dienyl alkali metal compounds.

6. A process comprising:
   establishing an homogeneous solution polymerization reaction admixture in a reaction zone, the absorbance characteristics of the active cement from said admixture, for a predetermined narrow wave length band of transmitted radiation within the ultraviolet range up to 4000 angstroms and the infrared range of from 7000 to 14,000 angstroms, being different from the absorbance characteristics of the terminated cement from said admixture, for said wave length of transmitted radiation;
   passing one beam of said radiation through a sample of said active cement, and a second beam of said radiation through a reference sample of said terminated cement; and comparing the absorbance characteristics of said active and reference samples.

7. The process of claim 6 wherein at least one reaction condition in said reaction zone is adjusted in response to the results obtained by comparing said absorbance characteristics.

8. The method of claim 6 wherein said transmitted radiation is a narrow wave length band in the ultraviolet range.

9. A method for providing a continuous monitoring of the active polydienyl lithium concentration in a homogeneous solution polymerization reaction admixture by observing the differential absorbance of transmitted ultraviolet radiation between active and deactivated portions of said reaction admixture which comprises:

establishing a homogeneous solution polymerization reaction zone containing a reaction admixture comprising active polydienyl lithium chains;

continuously removing a stream of said active admixture from said zone;

continuously treating a portion of said stream with a deactivating agent to produce a deactivated polydienyl reference sample;

continuously monitoring the differential absorbance of transmitted ultraviolet radiation between said reference sample and an active portion of said stream; and regulating at least one reaction condition in said reaction zone in response to the values obtained for said differential absorbance.

10. The method of claim 9 wherein said polydienyl lithium is polybutadienyl lithium.

11. The method of claim 9 wherein said polydienyl lithium is polyisoprenyl lithium.

12. The method of claim 9 wherein said transmitted ultraviolet radiation band has a wave length of about 3,130 angstroms.

13. The method of claim 9 wherein said polydienyl lithium is polystyrene-butadienyl lithium.

References Cited

UNITED STATES PATENTS 3,475,392  10/1969  McCoy et al. _____ 260—83.7

JOSEPH L. SCHOFER, Primary Examiner

R. A. GAITHER, Assistant Examiner

U.S. Cl. X.R.

260—83.7, 93.1, 93.5, 94.2